United States Patent [19]

Evans

[11] Patent Number: 5,907,840
[45] Date of Patent: May 25, 1999

[54] OVERLAPPING SUBDOCUMENTS IN A VECTOR SPACE SEARCH PROCESS

[75] Inventor: David A. Evans, Pittsburgh, Pa.

[73] Assignee: Claritech Corporation, Pittsburgh, Pa.

[21] Appl. No.: 08/900,019

[22] Filed: Jul. 25, 1997

[51] Int. Cl.[6] .................................................. G06F 17/30
[52] U.S. Cl. ............................................. 707/5; 707/500
[58] Field of Search .............................. 707/3, 500, 513, 707/910, 5

[56] References Cited

U.S. PATENT DOCUMENTS

| 5,642,502 | 6/1997 | Driscoll | 707/5 |
| 5,724,567 | 3/1998 | Rose et al. | 707/2 |
| 5,724,571 | 3/1998 | Woods | 707/5 |
| 5,794,178 | 8/1998 | Caid et al. | 704/9 |

Primary Examiner—Paul Kulik
Attorney, Agent, or Firm—Jones, Day, Reavis & Pogue; Blaney Harper

[57] ABSTRACT

The present invention is a method and apparatus for retrieving information from a database. Initially, the documents within the database are divided into mutually exclusive subdocuments that generally correspond to paragraphs of text. The present invention further creates a second set of subdocuments that overlap adjacent paragraphs of text. In particular, the location of the overlapping subdocuments depends on the size of the initial paragraphs. This second set of overlapping subdocuments are scored just as the mutually exclusive subdocuments are scored. The scores from both the mutually exclusive and overlapping subdocuments are used in ranking the relevance of documents to a query. The use of both sets of subdocument scores improves the effectiveness of the scoring algorithm.

8 Claims, 6 Drawing Sheets

\*
1
\#
BW REPORT #22:
\#
\!
-1 (PA VIEW) ( ) T
-1 (IS) ( ) V
-1 (COMPARED) ( ) V
-1 (TO) ( ) P
-1 (PREVIOUS EXAMINATION) ( ) T
-1 (DATED) ( ) V
-1 (10 22 91) ( ) X
\$
-1 (SURGICAL CLIP) ( ) T
-1 (ARE) ( ) V
-1 (AGAIN) ( ) A
-1 (SEEN) ( ) V
-1 (ALONG) ( ) P
-1 (RIGHT MEDIASTINUM) ( ) T
-1 (AND) ( ) C
-1 (RIGHT HILAR REGION) ( ) T
\$
-1 (ARE) ( ) V
-1 (NEW SURGICAL CLIP) ( ) T
-1 (IN) ( ) P
-1 (DISTRIBUTION) ( ) T
-1 (OF) ( ) P
-1 (CIRCUMFLEX ARTERY) ( ) T
-1 (AS WELL AS) ( ) C
-1 (4 INTACT STERNOTOMY WIRE) ( ) T
\$
-1 (IS) ( ) V
-1 (PERSISTENT INCREASED RIGHT PARAMEDIASTINAL OPACITY) ( ) T
-1 (POSSIBLY) ( ) A
-1 (RELATED) ( ) V
-1 (TO) ( ) P
-1 (PREVIOUS RADIATION THERAPY) ( ) T
\$
-1 (NEW PLATE LIKE OPACITY) ( ) T
-1 (ARE) ( ) V
-1 (SEEN) ( ) V

OVERLAPPING SUBDOCUMENTS IN A VECTOR SPACE SEARCH PROCESS

FIELD OF THE INVENTION

This invention relates to computer information search and retrieval systems. More particularly, this invention relates to methods and apparatus for optimizing the analysis of documents associated with text searching in databases.

BACKGROUND OF THE INVENTION

A critical problem for users of large databases is searching the ever growing volume of text in the databases. It has been estimated that in excess of 90% of all desired intelligence information is available in documents residing in accessible databases. In order for this information to be useful, a user must be able to locate specific documents relating to specific queries. Existing information retrieval systems make use of inefficient techniques to return relevant documents. Generally, these existing information retrieval systems miss highly relevant documents associated with the user's query. For example, conventional information retrieval systems use Boolean logic-based query execution techniques in which keywords are connected together via logical or proximity operators. A logical operator is used to include or exclude particular terms in a search. Proximity operators merely enforce a combination of keywords appearing within a certain numerical range of words. The Boolean search is limited to searching in documents of the database that have occurrences of the keyword combination. Such a system merely returns a list of any documents that includes one of the keyword combinations. Significantly, the Boolean search system has no quantifiable measure of how similar the documents returned are to the query (other than the fact that a Boolean logic combination exists in the document).

The ability to provide a quantifiable measure of similarity between a query and individual documents is important in two ways. First, a user must be able to determine whether the set of documents returned is meaningful at all. Second, the user must also be able to separate out the meaningful documents from documents that have been returned that do not relate in any significant way to the query even though they may include some combinations of key words. That is, users must be able to rank the documents that have been returned in relation to the query. Since Boolean-type searches do not provide a quantifiable measure of similarity between the query and the documents in the database, they fail to provide the user of the database with significant information concerning the search and the documents in the database.

In response to the shortcomings of Boolean-type search systems, vector space-type search systems have been developed. In a vector space-type search system, a score related to a query is computed for each document in the database. In general, the similarity score between a query "Q" and a document "D" can be compared by evaluating the shared and disjoint features of the query and the document over an orthogonal space of T terms that originate from the database. For example, the similarities score can be computed by the following formula:

$$S(Q_i, D_j) = \frac{Q_i \cdot D_j}{|Q| \cdot |D|} = \frac{\sum_{k=1}^{t}(q_{i_k} \cdot d_{i_k})}{\sqrt{\sum_{k=1}^{t} q_{i_k}^2} \cdot \sqrt{\sum_{k=1}^{t} d_{i_k}^2}}$$

where $Q_i$ refers to terms in the query and $D_j$ refers to terms in the document.

This scoring technique can be illustrated on the following sample set of queries and documents:

| Terms | $Q_1$ | $Q_2$ | $D_1$ | $D_2$ |
|---|---|---|---|---|
| dog | 1 | 1 | 2 | — |
| cat | 1 | — | — | 1 |
| hat | 1 | — | 1 | — |
| bat | 1 | — | — | — |
| mat | 1 | 1 | — | — |
| hut | — | 1 | 2 | — |
| cut | — | 1 | — | 2 |
| luck | — | — | 3 | — |
| buck | — | — | 1 | — |
| muck | — | — | — | 3 |

In this table, the Terms column lists a union of all the terms contained in the two documents $D_1$ and $D_2$. The scores of $D_1$ and $D_2$ refer to the frequency of those terms as they appear in the documents. The scores of $Q_1$ and $Q_2$ refer to frequency of the terms as they appear in the query. The similarity score of the query $Q_1$ to document $D_1$ is computed as:

$$S_G(Q_1, D_1) = \frac{(1 \cdot 2) + (1 \cdot 1)}{\sqrt{1^2 + 1^2 + 1^2 + 1^2 + 1^2} \cdot \sqrt{2^2 + 1^2 + 2^2 + 3^2 + 1^2}} = \frac{3}{\sqrt{5} \cdot \sqrt{19}} = 0.31$$

Also, the similarity of the query $Q_1$ to document $D_2$ is computed as $S(Q_1, D_2) = 0.12$. As can be seen from the above example, the similarity score of query $Q_1$ to document $D_1$ is higher than the similarity score of query $Q_1$ to document $D_2$. As a result, the similarity score provides a relative measure of the document to the query. Since these relative scores can be determined for all documents in a database, the user can empirically determine when scores are meaningful, and as a result, derive significant information from documents that are ranked by their score.

In order to derive significant information from the rank and score of particular documents, it is necessary that the number of terms in the term space over which the computations are performed must be comparable between documents. In the example given above, the score computed for each document varies according to the number of terms over which the score is calculated. The score of $Q_1$ to $D_1$ in this instance is 0.31 and is based on using all of the terms (global term space) in the document database. If only the terms in the union of the queries $Q_1$ and $Q_2$ are used as the term space, the score is 0.45. This simple example illustrates that the term space over which documents are compared must be of similar size.

Generally, scoring a document of controlled size on the co-occurrence of terms between a query and a document is more effective than scoring a large document. In fact, controlling document size even increases the effectiveness of searches based on Boolean combinations of keywords. However, databases do not generally store documents by comparable size. The more general case is that any particular database will have documents that may range from as little as one page or less to as many as thousands pages or more. As a result, the document analysis technique must control for this wide range of document sizes. Conventional vector space analysis techniques do not control for document size because they only operate on whole documents. A refinement to conventional vector space analysis is to normalize the scoring process by arbitrarily breaking up the documents into a set of mutually exclusive subdocuments and analyzing the subdocuments as documents. Subdocument size is controlled in this refined analysis by merely selecting a number of words per subdocument and counting the absolute number of words in the document to create the subdocument boundary. Subdocument boundaries are also created by preprocessing the document to remove meaningless words such as "at", "the", etc. and then counting the words. The size of these subdocuments will not vary by definition. As a result, the scoring errors due to the term space differences are reduced.

The problem with creating subdocuments in this way is that arbitrarily breaking up documents by the number of words may introduce a different type of scoring error. Since adjacent text in a document often contains information related to the same idea, the context of a phrase in one section of text may be lost when arbitrarily separated from adjacent text. In order to avoid separating areas of text that are related, the subdocuments can be created based on paragraphs in the document. This is because paragraphs generally reflect the judgment of the author of the document concerning which areas of text are related. The problem with creating subdocuments base on paragraphs is that the size of paragraghs vary greatly. As discussed above, this variation in size affects the scoring of the subdocuments.

OBJECTS OF THE INVENTION

It is therefore an object of the present invention to analyze documents in a database.

It is the further object of the present invention to determine the similarity of a document in a database relative to a particular query.

It is still a further object of the present invention to determine the relative similarity of a plurality of documents in a database to a query.

It is still a further object of the present invention to determine the relative similarity of a plurality of documents in a database to a query wherein the documents have a wide range of sizes.

It is still a further object of the present invention to determine the relative similarity of a plurality of documents in a database to a query wherein the documents have a wide range of sizes without losing the context of adjacent text in the document.

SUMMARY OF THE INVENTION

The present invention is a method and apparatus for retrieving information from a database. Initially, the documents within the database are divided into mutually exclusive subdocuments that generally correspond to paragraphs of text. The present invention further creates a second set of subdocuments that overlap adjacent paragraphs of text. In particular, the location of the overlapping subdocuments depends on the size of the initial paragraphs. This second set of overlapping subdocuments are scored just as the mutually exclusive subdocuments are scored. The scores from both the mutually exclusive and overlapping subdocuments are used in ranking the relevance of documents to a query. The use of both sets of subdocument scores improves the effectiveness of the scoring algorithm.

DETAILED DESCRIPTION OF THE INVENTION

Figure 1:
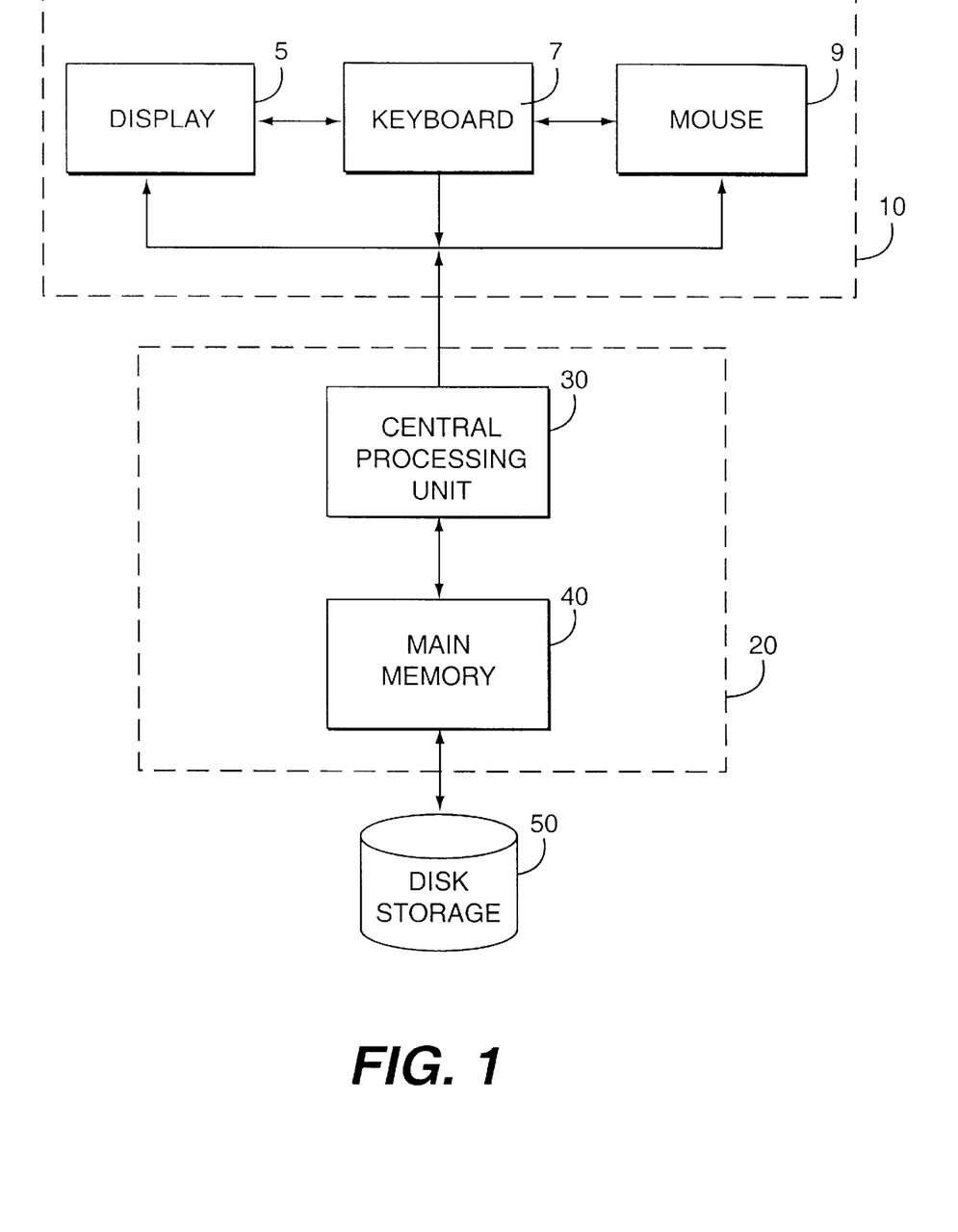
FIG. 1 is an illustration of a computer system for retrieving information from a database according to the present invention.

FIG. 1 is a block diagram of a computer system used for retrieving information from a database. Computer 20 comprises a central processing unit (CPU) 30 and main memory 40. Computer 20 is coupled to an Input/Output (I/O) system 10 and disk storage unit 50. The I/O system 10 includes a display 5, a keyboard 7 and a mouse 9. In general, the disk storage unit 50 stores the program for operating the computer system and it stores the documents of the database. The computer 20 interacts with the I/O system 10 and the disk storage unit 50. The computer 20 executes a search program that is retrieved from the disk storage unit 50. The search program contains a series of instructions that cause the computer 20 to retrieve the text of documents, or parts thereof, that are stored in the database which are the most relevant to a query. The query is be created and sent to the computer in a variety of ways. The query can be typed into keyboard 7 or selected from a predefined list by operating the mouse 9. Also, the search program can generate a query automatically.

The computer 20 responds to the query by retrieving documents from the database in the disk storage unit 50 and analyzing all of them to determine their relevance to the query. During the analysis process, the computer 20 interacts with the disk storage unit 50 to create a series of subdocuments for each document and to compute a score for each subdocument. The computer 20 then selects the subdocuments that are most relevant to the query. The computer 20 then uses this information to retrieve the text of the most relevant subdocuments and/or its associated documents and to transmit that text to the I/O unit 10.

Figure 2:
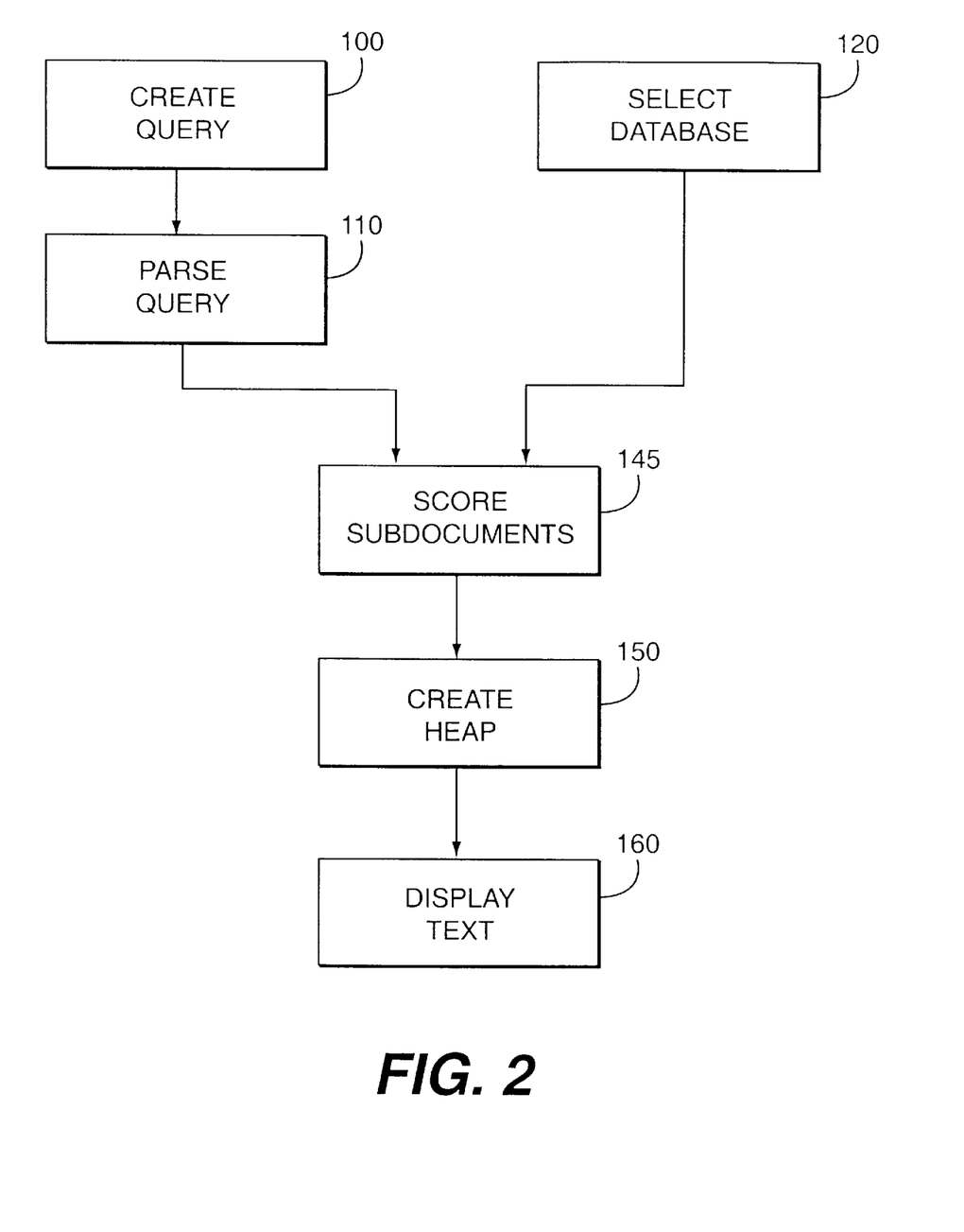
FIG. 2 is an illustration of a process for retrieving information from a database according to the present invention.
Figure 3:
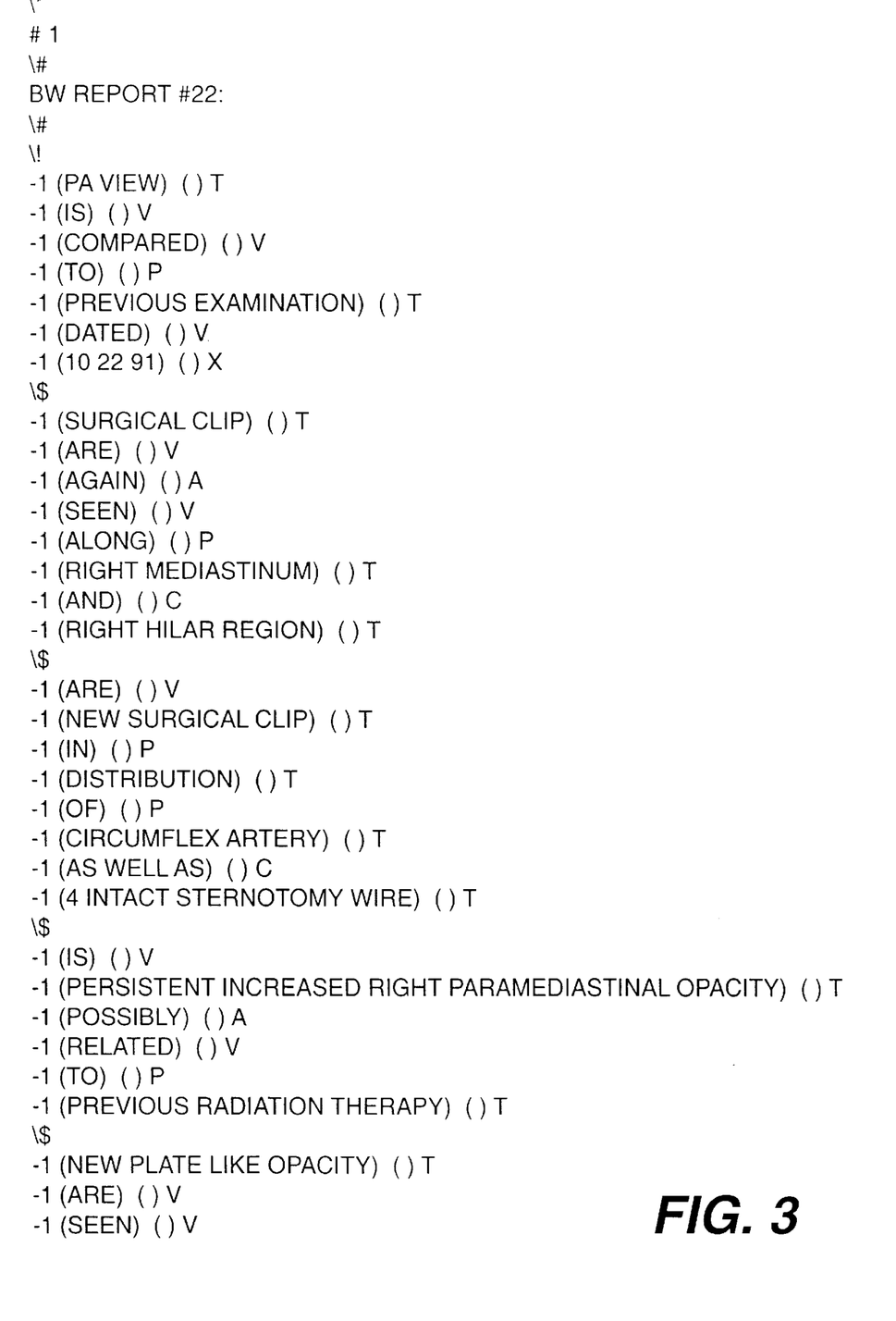
FIG. 3 is an illustration of the result of parsing text by noun phrases.

FIG. 2 is a flow chart that illustrates the general operation of the present invention. Step 100 initially creates a query through the keyboard or other similar device. In Step 110, the query is parsed. The parsing process can be as simple as merely listing each word in the query. Step 110 uses a more complex process in which the query is processed into noun phrases. This process assigns a linguistic structure to sequences of words in a sentence. Terms, including noun phrases, having semantic meaning are listed. This parsing process can be implemented by a variety of techniques known in the art such as the use of lexicons, morphological analyzers or natural language grammar structures. FIG. 3 is an example listing of text that has been parsed for noun phrases. As is evident from the list on FIG. 3, the phrases tagged with a 'T' are noun phrases, those tagged with a 'V' are verbs, those tagged with an 'X' are quantities and so on.

In addition to processing the query, Step 120 of FIG. 2 selects a database. Typically, the selection of the database does not depend on the query. The selection of a database is normally a user input to the computer system. However, the selection of a database could also be an automated process based on a predetermined list of databases in which the selection criteria is related to the query.

Figure 4:
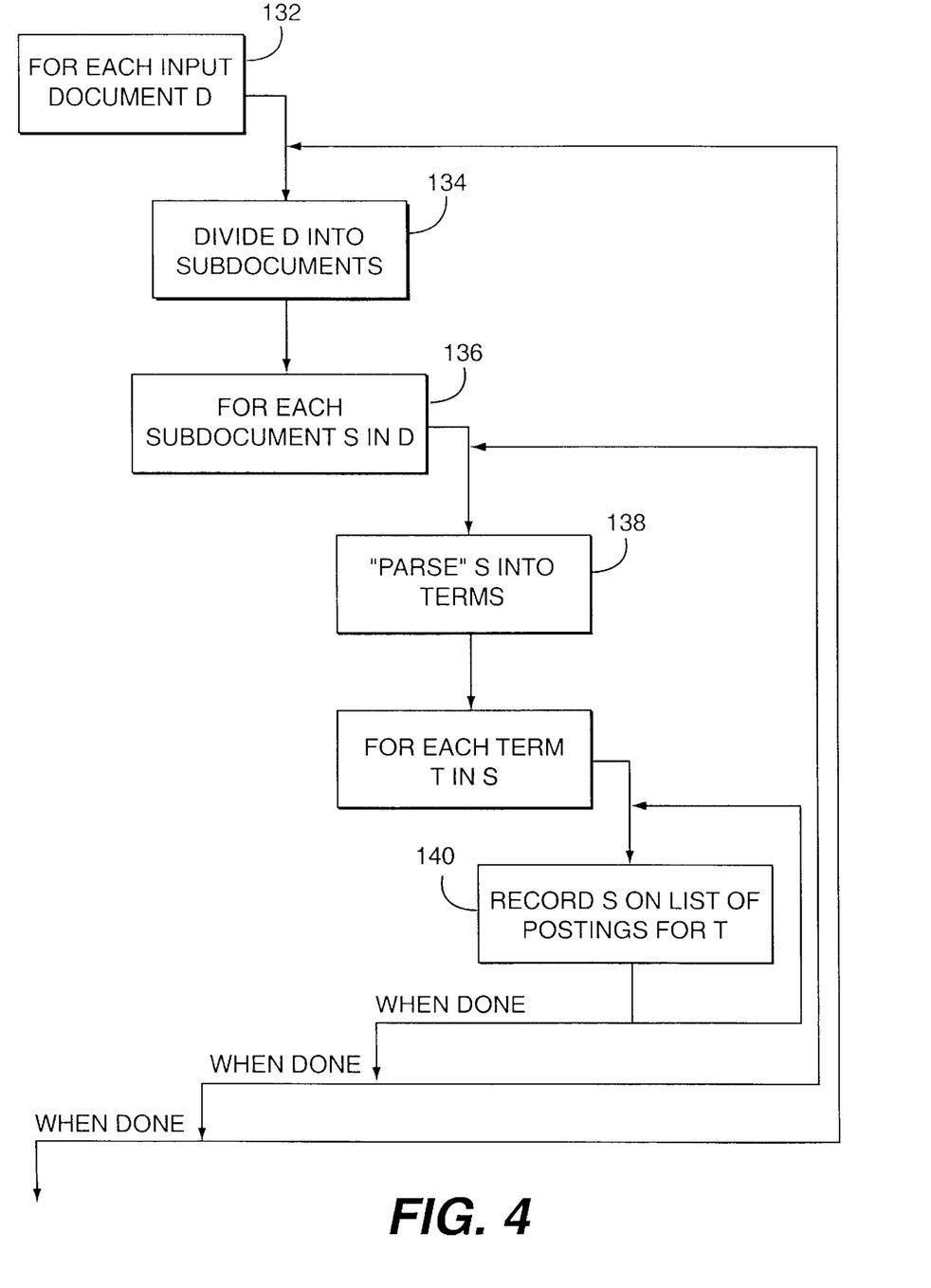
FIG. 4 is an illustration of a process for inverting a database according to the present invention.

The database that is selected in step 120 has been preprocessed such that it is inverted prior to being selected. The process for inverting a database is illustrated in FIG. 4. The first step in the inversion process 132 is to select a document from a database. In step 134, the documents in the database are divided into subdocuments. There are two types of subdocuments created in the process of FIG. 4. The first type of subdocument has its boundaries created on paragraph breaks unless the paragraph is too short or too long. That is, subdocuments correspond to paragraphs in the order that they appear in the document until a paragraph has fewer than a first preselected threshold number of sentences or words or until a paragraph has more than a second preselected threshold number of sentences or words.

Figure 5:
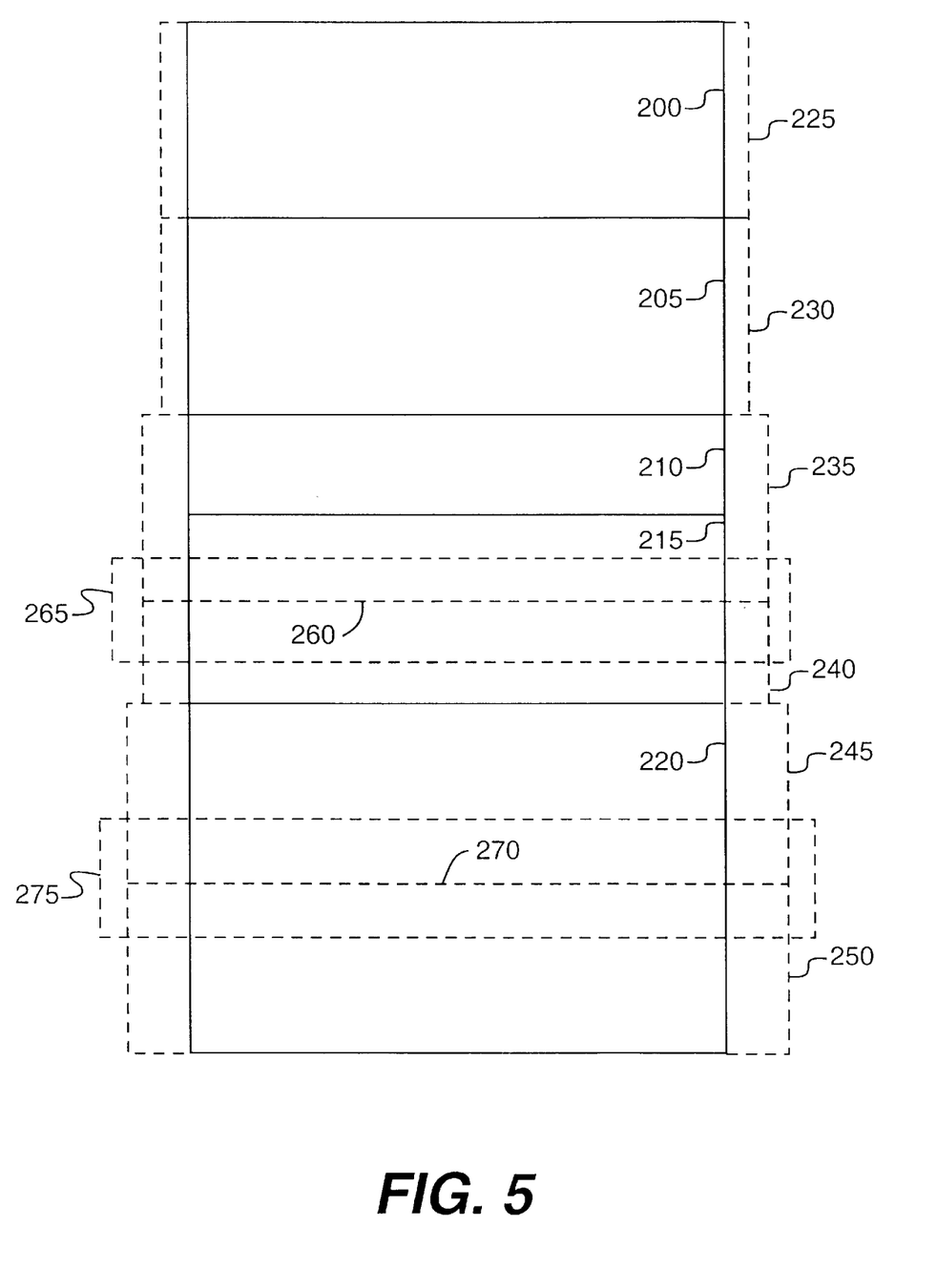
FIG. 5 is an illustration of a process for creating subdocuments associated with retrieving information from a database according to the present invention.

FIG. 5 illustrates an example of this subdocument creation process. The document of FIG. 5 consists of 5 paragraphs. Paragraphs 200 and 205 contain 14 sentences each, paragraph 210 contains 3 sentences and paragraphs 215 and 220 contain 30 sentences each. The subdocuments 225 and 230 correspond to paragraphs 200 and 205 because they contain more than a first preselected threshold of 8 sentences and less than a second preselected threshold of 20 sentences. Subdocument 235 begins at the boundary between paragraphs 205 and 210 but, since paragraph 210 contains less than 8 sentences, subdocument 235 does not end at the paragraph boundary between paragraphs 210 and 215. Rather, the combination of paragraph 210 and 215 are examined to determine whether they contain greater than 20 sentences. Since this is the case, a default paragraph size is selected (for example, 12 sentences) and the 3 sentences of paragraph 210 are added with the first 12 sentences of paragraph 215 to form subdocument 235. Subdocument 240 is formed from the remaining sentences of paragraph 215. Subdocuments 245 and 250 are created from paragraph 220 because paragraph 220 contains more than 20 sentences.

The process illustrated in FIG. 5 creates a series of subdocuments 225, 230, 235, 240, 245 and 250 that contain respectively, 14, 14, 15, 18, 12 and 18 sentences. For purposes of scoring subdocuments in a vector space analysis, the size of these subdocuments is comparable. However, this subdocument creation process has divided the document text in places that are not on paragraph boundaries. These artificial breaks, illustrated at 260 and 270 of FIG. 5, separate text that the author of the document believed should be grouped together. In order to capture the author's judgment in the scoring process, overlapping subdocuments are created at these artificial break points. The overlapping subdocuments, illustrated as 265 and 275 in FIG. 5 are centered over the artificial text break boundary and have a total size equal to the default paragraph size.

In the subdocument creation process (step 134 of FIG. 2), the parameters for the minimum, maximum and default sizes of the subdocuments can be larger or smaller than the numbers given in the example discussed above. Normally, these parameters will be empirically determined and may vary depending on the type of database. For example, these parameters may be set differently for processing a scientific database than for processing a literature database.

Returning to FIG. 4, once the subdocuments have been created, all of the subdocuments are parsed in Steps 136 and 138. In this example, the parsing process is the same noun phrase parsing process used for the query. Once the subdocuments have been parsed, a term list containing subdocument noun phrases and the subdocuments in which the noun phrases appear is generated in Step 140. All the subdocuments for each document are processed in this way and the list of terms and subdocuments is updated. Finally, all the documents of a database are processed according to Steps 132–140. The result of this inversion process is a term list identifying all the terms (specifically noun phrases in this example) of a database and their associated subdocuments.

Figure 6:
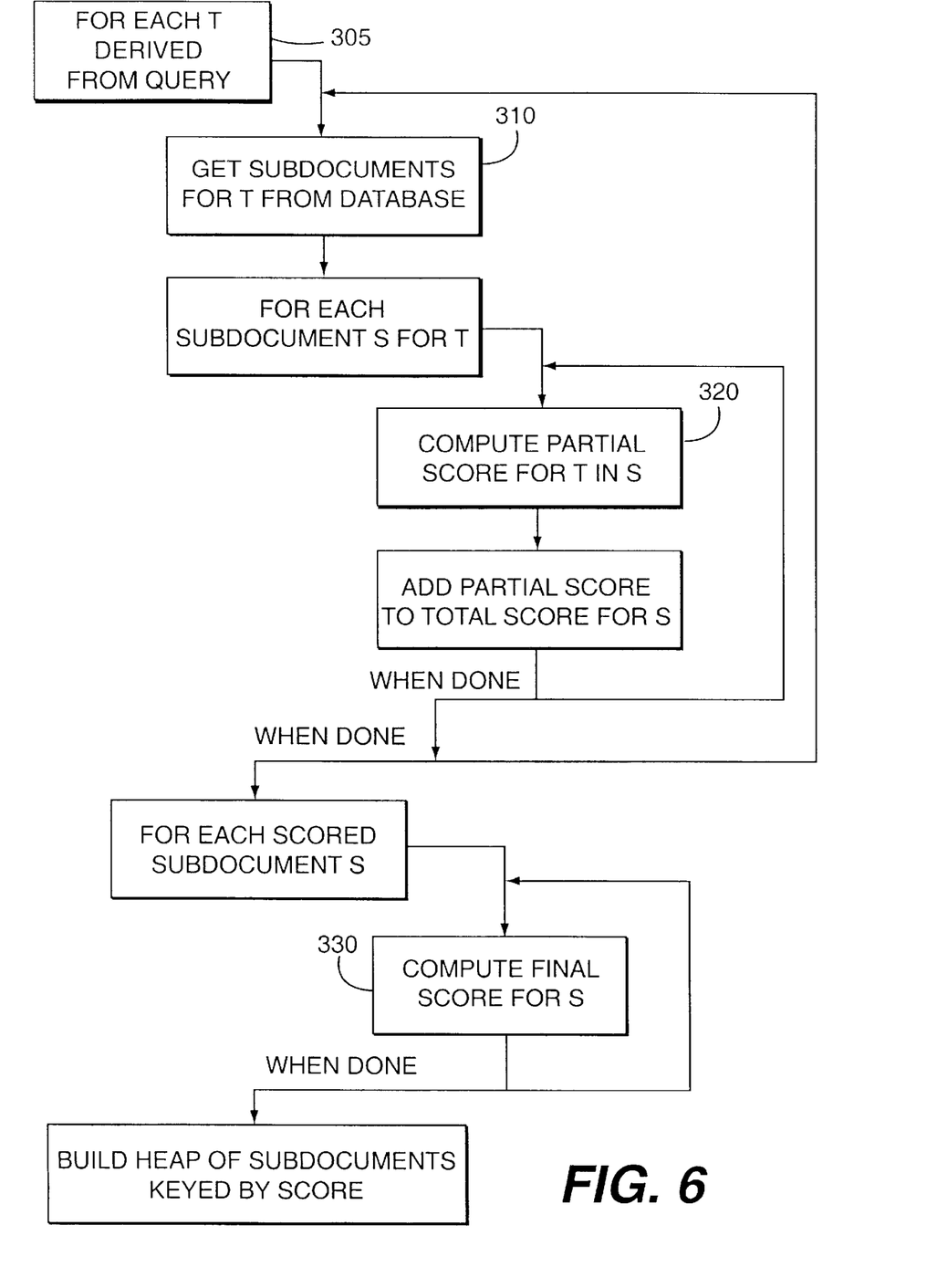
FIG. 6 is an illustration of a process for scoring a database according to the present invention.

Returning to FIG. 2, once the inverted database has been selected and the query has been parsed, the subdocuments of the database are scored against the query in Step 145. FIG. 6 illustrates the process for scoring the subdocuments. In Step 305 of FIG. 6, a term is selected from the query. In Step 310, all the subdocuments in which that term appears are returned from the inverted database. For each of the subdocuments, a similarity score for the query term and the subdocument is computed in Step 320. These similarity scores for all the subdocuments are computed and summed over all the query terms. A final score for each subdocument is generated in Step 330.

After each subdocument has been scored in Step 145 of FIG. 2, Step 150 performs a heap sort process to rank order the documents of the database according to the best scoring subdocument for each document. The best scoring subdocument could be either a paragraph type subdocument or an overlapping type subdocument. Since paragraphs are often limited to single topics, the subdocuments corresponding to paragraphs are normally the best scoring subdocuments. However, when artificial breaks in the paragraph text have been introduced, topics may bridge text in adjacent subdocuments. In these types of cases, an overlapping subdocument will sometimes be the highest scoring subdocument. In these cases, the adjacent paragraph subdocuments will not score as high as the overlapping subdocument because the context of the topic was lost when the text of the paragraph was divided. As a result, the use of the combination of paragraph and overlapping subdocuments in scoring documents is effective for selecting the most relevant documents. This scoring technique avoids the loss of search meaning that occurs when arbitrary boundaries for subdocuments are used in relevance scoring while also normalizing the scoring process for the size of the document.

Returning to FIG. 2, once the documents have been rank ordered in Step 150, the computer system sequentially displays text from the highest ranking documents in Step 160. The displayed text is normally the text from the highest ranking subdocument. In alternate embodiments, the displayed text can be the entire document. In still further embodiments, the displayed text could be a list (ranked by score) of the subdocuments in the document.

While this invention has been particularly described and illustrated with reference to particular embodiments thereof, it will be understood by those skilled in the art that changes in the above description or illustrations may be made with respect to form or detail without departing from the spirit or scope of the invention.

I claim:

1. A method for displaying documents from a database, comprising:

generating a plurality of paragraph subdocuments for a plurality of documents in a database;

generating a plurality of overlapping subdocuments for a plurality of documents in the database;

generating a score for each of the paragraph and overlapping subdocuments wherein said score relates a subdocument to a query of said database;

sorting the subdocuments into a rank order based on said score; and displaying text from a document from which said highest ranked subdocument originates.

2. A method for displaying documents from a database, as in claim 1, further comprising:

generating said overlapping subdocuments from at least two paragraphs in one of said documents.

3. A method for displaying documents from a database, as in claim 1, further comprising:

generating a plurality of subdocuments from a single paragraph in one of said documents.

4. A method for displaying documents from a database, as in claim 1, further comprising:

displaying text from a plurality of documents wherein an order for said display corresponds to said order of said ranked subdocuments.

5. An apparatus for displaying documents from a database, comprising:

a computer coupled to a disk storage unit and a display unit, said disk storage unit stores a database in at least one file, said computer retrieves data from said database file and generates a plurality of paragraph subdocuments for a plurality of documents in a database;

said computer retrieves data from said database file and generates a plurality of overlapping subdocuments for a plurality of documents in the database;

said computer generates a score for each of said paragraph and overlapping subdocuments wherein said score relates a subdocument to a query of said database;

said computer sorts said subdocuments into a rank order based on said score; and said computer displays on said display unit text from a document from which said highest ranked subdocument originates.

6. An apparatus for displaying documents from a database, as in claim 5, wherein:

said computer generates said overlapping subdocuments from at least two paragraphs in one of said documents.

7. An apparatus for displaying documents from a database, as in claim 5, wherein:

said computer generates a plurality of subdocuments from a single paragraph in one of said documents.

8. An apparatus for displaying documents from a database, as in claim 5, wherein:

said computer displays text on said display unit from a plurality of documents wherein an order for said display corresponds to said order of said ranked subdocuments.

* * * * *